United States Patent
Guim Bernat et al.

(10) Patent No.: US 11,909,841 B2
(45) Date of Patent: Feb. 20, 2024

(54) SYSTEM, APPARATUS AND METHOD FOR ADAPTIVE PEER-TO-PEER COMMUNICATION WITH EDGE PLATFORM

(71) Applicant: Intel Corporation, Santa Clara, CA (US)

(72) Inventors: Francesc Guim Bernat, Barcelona (ES); Kshitij Arun Doshi, Tempe, AZ (US); Kenneth Shoemaker, Los Altos Hills, CA (US); Vinodh Gopal, Westborough, MA (US); Ned M. Smith, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 755 days.

(21) Appl. No.: 16/887,087

(22) Filed: May 29, 2020

(65) Prior Publication Data
US 2021/0377356 A1 Dec. 2, 2021

(51) Int. Cl.
*H04L 29/08* (2006.01)
*H04L 67/56* (2022.01)
(Continued)

(52) U.S. Cl.
CPC ............ *H04L 67/56* (2022.05); *H04L 47/805* (2013.01); *H04L 49/109* (2013.01); *H04L 49/3018* (2013.01); *H04L 49/9068* (2013.01)

(58) Field of Classification Search
CPC ..... H04L 67/56; H04L 47/805; H04L 49/109; H04L 49/3018; H04L 49/9068;
(Continued)

(56) References Cited

U.S. PATENT DOCUMENTS 6,934,760 B1 * 8/2005 Westbrook .......... H04L 49/1523
709/236
7,826,469 B1 * 11/2010 Li ...................... H04L 47/6215
370/428
(Continued)

OTHER PUBLICATIONS

Intel Corporation, "White Paper—New-Generation Central Office (NGCO)," 2019, 13 pages total.
(Continued)

*Primary Examiner* — Wutchung Chu
(74) *Attorney, Agent, or Firm* — Trop, Pruner & Hu, P.C.

(57) ABSTRACT

In one embodiment, a method includes: receiving, in an edge platform, a plurality of messages from a plurality of edge devices coupled to the edge platform, the plurality of messages comprising metadata including priority information and granularity information; extracting at least the priority information from the plurality of messages; storing the plurality of messages in entries of a pending request queue according to the priority information; selecting a first message stored in the pending request queue for delivery to a destination circuit; and sending a message header for the first message to the destination circuit via at least one interface circuit, the message header including the priority information, and thereafter sending a plurality of packets including payload information of the first message to the destination circuit via the at least one interface circuit. Other embodiments are described and claimed.

18 Claims, 10 Drawing Sheets

(51) Int. Cl.
  *H04L 49/00* (2022.01)
  *H04L 47/80* (2022.01)
  *H04L 49/90* (2022.01)
  *H04L 49/109* (2022.01)

(58) Field of Classification Search
  CPC ..... H04L 47/6275; H04L 47/11; H04L 49/15; H04L 67/146; H04L 67/565; H04L 67/567; H04L 67/025; H04L 67/1004; H04L 67/1078; H04L 67/1097; H04L 67/566; H04L 67/61
  See application file for complete search history.

(56) References Cited

U.S. PATENT DOCUMENTS

| | | | | |
|---|---|---|---|---|
| 8,244,810 | B1* | 8/2012 | Haldar | H04L 51/04 709/206 |
| 8,306,062 | B1* | 11/2012 | Cohen | H04L 69/161 370/473 |
| 8,432,936 | B2* | 4/2013 | Ling | H04N 7/148 370/328 |
| 8,797,864 | B2* | 8/2014 | Gershinsky | H04L 47/22 370/230.1 |
| 10,201,006 | B2* | 2/2019 | Sun | H04J 11/0036 |
| 11,044,589 | B2* | 6/2021 | Nguyen | H04W 28/065 |
| 11,627,060 | B2* | 4/2023 | Chia | H04W 4/46 370/238 |
| 2002/0118640 | A1 | 8/2002 | Oberman | H04L 49/25 370/389 |
| 2002/0141425 | A1* | 10/2002 | Merani | H04L 47/527 370/444 |
| 2003/0101274 | A1* | 5/2003 | Yi | H04L 47/34 709/250 |
| 2005/0068941 | A1* | 3/2005 | Erhart | H04L 65/1101 370/352 |
| 2005/0249497 | A1* | 11/2005 | Haran | H04Q 11/0067 398/58 |
| 2006/0112272 | A1* | 5/2006 | Morioka | H04L 63/0442 713/171 |
| 2007/0211682 | A1* | 9/2007 | Kim | H04L 65/1083 370/338 |
| 2008/0008203 | A1* | 1/2008 | Frankkila | H04L 47/2458 370/428 |
| 2010/0158015 | A1* | 6/2010 | Wu | H04L 49/9094 370/395.7 |
| 2010/0238932 | A1* | 9/2010 | Kliger | H04L 12/4633 370/392 |
| 2012/0246263 | A1* | 9/2012 | Negishi | H04L 47/365 709/217 |
| 2012/0320772 | A1* | 12/2012 | Frederiks | H04L 47/10 370/252 |
| 2016/0065484 | A1* | 3/2016 | Suzuki | H04L 47/623 370/415 |
| 2017/0099231 | A1* | 4/2017 | Li | H04L 43/0888 |
| 2018/0191629 | A1* | 7/2018 | Biederman | H04L 47/6225 |
| 2018/0191631 | A1* | 7/2018 | Biederman | H04L 69/22 |
| 2018/0191632 | A1* | 7/2018 | Biederman | H04L 47/6275 |
| 2018/0191642 | A1* | 7/2018 | Biederman | H04L 69/16 |
| 2019/0191330 | A1* | 6/2019 | Dao | H04L 69/22 |
| 2021/0021607 | A1* | 1/2021 | Bartolucci | H04L 1/0076 |
| 2021/0218808 | A1* | 7/2021 | Graham | H04L 67/566 |
| 2022/0376846 | A1* | 11/2022 | Breuer | H04L 1/1887 |

OTHER PUBLICATIONS

Intel Corporation, Kerry Zhang, et al., "White Paper—Implementing A High Performance BNG With Intel Universal NFVI Packet Forwarding Platform Technology," Jun. 2019, 10 pages.

* cited by examiner

SYSTEM, APPARATUS AND METHOD FOR ADAPTIVE PEER-TO-PEER COMMUNICATION WITH EDGE PLATFORM

TECHNICAL FIELD

Embodiments relate to communicating in edge cloud infrastructures.

BACKGROUND

As ever more devices become interconnected across a wide variety of use cases, there exist difficulties in achieving efficient management, movement, and sharing of data among many different devices. This is especially so given that devices may connect and seek access to varied resources including hybrid computation, network, storage and acceleration hardware. Such devices may seek to access an edge cloud ecosystem to handle just-in-time complex content processing and bandwidth demanding workloads, where the dispatching and execution of requests can be under stringent real-time requirements. However, current edge resources do not efficiently handle disparate priorities, data sizes and other asymmetric aspects of requests from different devices.

DETAILED DESCRIPTION

Figure 1:
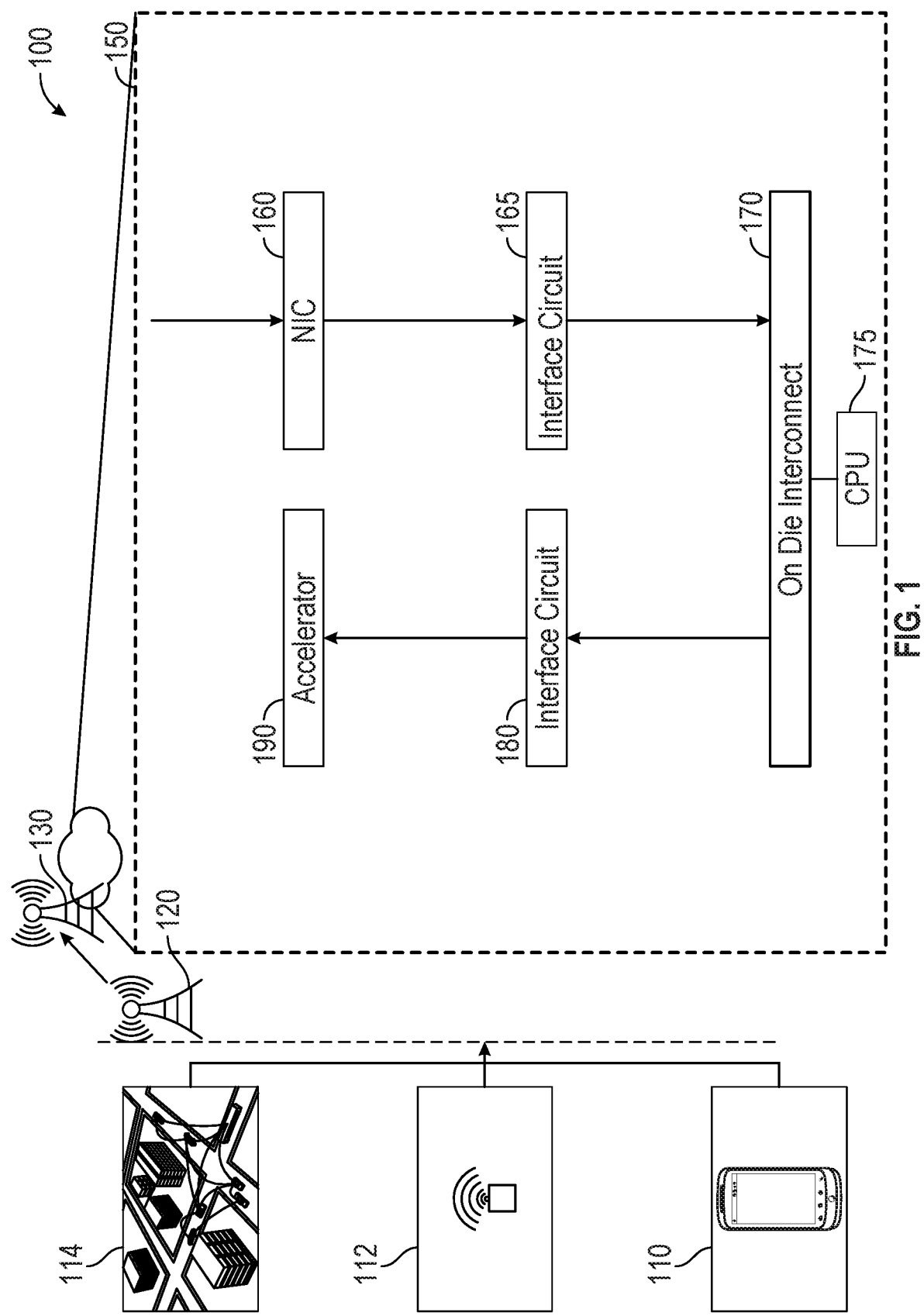
FIG. 1 is a block diagram of a network in accordance with an embodiment of the present invention.

In various embodiments, an edge platform is provided to efficiently handle disparate requests for different device types. More specifically, embodiments provide scalable, tiered and power efficient architectures that enable efficient inter-operation with accelerators for edge platform and Internet of Things (IoT) device deployments. Example use cases include manufacturing, manned aviation, unmanned aerial transport, autonomous and assisted vehicles, health-monitoring, smart surveillance, and so on. Of course embodiments are not limited to IoT embodiments, and implementations can be used in a wide variety of computing platforms ranging from small portable devices to large datacenter systems. With such architectures, incoming requests (e.g., from different device types) having different priorities and subscriber level agreements (SLAs) may be handled in an agile manner, so that a determination as to whether to process a given request as part of a batch or to dispatch it immediately may be based on a real-time control loop. Embodiments thus may realize efficient data processing schemes for data payloads of differing granularities (e.g., 64 bytes (B), 4 kilobytes (KB), 1 megabyte (MB) etc.).

In contrast, typical processor and platform architectures lack efficient and adaptive peer-to-peer (P2P) data transmission schemes between discrete devices: (1) when different types of flows with different data payloads arise; (2) they have varied processing priorities; and (3) they have to be performed in the same platform. Such edge architectures are in contrast to large data center architectures having different compute pools, each optimized for different workload demands.

As an example use case of an embodiment to efficiently handle incoming requests from edge devices, consider an edge platform to which multiple disparate distributed edge devices may send requests. These edge devices may take many different forms. Assume one example edge device is a sensor that sends 64 byte chunks to be processed by a destination such as an accelerator, storage unit or so forth within the edge platform. As another example edge device, a smartphone may send request having a much larger chunk size, e.g., 4 KB. Such requests also may be processed by the same destination or a different destination within the edge platform. Further assume that internally to the edge platform, different components may couple via interfaces and interconnects that can communicate at a certain data width, e.g., 512 bytes or another width. In this example, sensor-based requests that are 64 bytes inefficiently consume interface resources within the edge platform. If all incoming requests are handled uniformly, e.g., each handled without batching and without buffering or merging, very inefficient communications within the edge platform occur. And as a result, inefficient processing of requests occurs. Instead in embodiments, disparate messages can be handled differently, e.g., according to at least priority and granularity information, to realize efficient end-to-end communication and handling.

With embodiments, common hardware interfaces may be provided within processors (e.g., central processing units (CPUs) or device intellectual property (IP) blocks), using which, communication payloads can be associated with (at least) priority and granularity parameters. These parameters serve as additional metadata by which queuing, scheduling, and input/output (I/O) chunking/pipelining may be performed at various stages of moving payloads from a sender to a receiver through various intermediaries in a common end-to-end manner. Also various optimizations and/or adaptations may be provided for queuing and scheduling algorithms within one or more communication fabrics that couple components in the path between sender and receiver.

Note to effectuate these chunking/pipelining determinations, additional metadata to preserve tenant boundaries may be provided where, for example, eight IoT devices at 64 bit message width are optimized into a 512-bit chunk, the 8 IoT devices (tenants) share a common chunk. Metadata may be used to ensure de-multiplexing occurs correctly on a back-end consumer of the chunked payload. Additionally, latency targets may differ across the 8 devices (e.g., 1 millisecond (ms), 5 ms, 10 ms . . . ) but messages may be chunked together, implying that the lowest latency requirement (e.g., 1 ms) is applied to all messages for the purpose of delivering the 512-bit chunk. The respective latency requirements may follow the data through de-multiplexing so that all messages do not get a free upgrade to the lowest latency (e.g., 1 ms) (where the SLA allows for slower acceptable deliveries).

The metadata containing SLA performance targets may occupy some of the payload bandwidth. For example if the metadata is 64 bits and the data is 64 bits, then the chunking size is 128 bits.

Example optimizations may include dynamic recalculation of priorities with time. In this way, competing objectives such as priority and payload size may be balanced by evaluating scheduling priorities that weigh the different competing objectives differently. For example, as will be described further herein, varying considerations of, e.g., latency and throughput among others, can be weighted in determining scheduling decisions. As one high level example, a latency objective may be given a weight of 80% and a throughput objective may be given a weight of 20%, in a given implementation. Of course embodiments are not limited in this regard, and a given implementation may itself be programmable to dynamically adapt weights for different parameters. For example, latency and throughput objectives may be defined with high-low ranges, where the SLA is satisfied if delivery falls within the ranges. Different key performance indicators can have different ranges, and analysis may be performed to ensure all of them can be met within the stated ranges. For example, it might not be possible to achieve a throughput of 500 bits/second maximum given a latency objective of less than 1 millisecond, e.g., for a message that is 2 MB on a channel that has a single pipeline that runs at 1 Kbits/sec.

Embodiments may further provide a communication fabric having capabilities for storing and merging built into the communication fabric. These storage and merging resources may be controlled on a dynamic basis, governed by, e.g., priority and granularity information associated with particular payloads. Still further, device interfaces may be configured so that they can accept and process payloads at different optimized granularities (or chunking). Embodiments may further capitalize on pipelined or systolic algorithms, at variable block sizes over which pipelining is done. In one embodiment, such algorithms may be implemented in software and executed on a CPU/graphics processing unit (GPU), or they may be in hardware, e.g., associated with accelerators.

In some embodiments, congestion on an interconnect may be dynamically measured. If no congestion is detected, then even if a flow indicated it would be good to merge multiple packets, instead the packets may be sent as soon as they arrive. Instead when the interconnect becomes congested (e.g., extending into a non-linear part of a bandwidth/latency curve), saving bandwidth becomes more important. Thus in some cases, congestion may be another component of a dynamic weighting scheme.

Referring now to FIG. 1, shown is a block diagram of a network in accordance with an embodiment of the present invention. As shown in FIG. 1, network 100 is an edge cloud services network in which various connected devices may locally or widely couple with an edge platform 150. More specifically as shown in FIG. 1, a variety of different edge devices are present and may couple to edge platform 150 via a radio access network (RAN) 120.

In the embodiment shown in FIG. 1, edge devices may include smartphones 110 or other small portable devices such as smartwatches, tablet computers, personal digital assistants or so forth. Edge devices further may include sensors 112 or other IoT devices. While in the embodiment of FIG. 1, sensor 112 is a body sensor, understand that embodiments are not limited in this regard and a wide variety of different sensor types, including industrial sensors such as may be present in a factory or other industrial setting, may be present. As further illustrated in FIG. 1, additional edge devices may include vehicle sensors, traffic sensors or other networked sensors 114.

As further illustrated in FIG. 1, various edge devices may communicate wirelessly via RAN 120 and through, e.g., one or more additional RAN's 130 and be received within edge platform 150. In various embodiments, edge platform 150 may be implemented as on-premises equipment of an edge service provider. As one example, edge platform 150 may be a locally distributed computing device, e.g., of a distributed edge services provider. For example, while a single edge platform 150 is shown, understand that a large amount of such platforms may be located in a particular on-premises location, e.g., implemented as multiple racks of cloud-based edge platforms. Note that edge platform 150 may be more power restricted, ruggedized and thermal aware than other types of architectures, and may have smaller form factors, e.g., 1U or 2U sized-solutions.

In the high level shown in FIG. 1, edge platform 150 includes a network interface circuit (NIC) 160 that may receive incoming messages from the edge devices. Note that NIC 160 (or other circuitry such as a mesh-stop/hub/Peripheral Component Interconnect Express (PCIe) flows in a CPU, or in IP blocks that may implement PCIe switches within or between hosts) may provide a common hardware interface at a hardware or device register level. Parameters of incoming messages are both honored locally to the extent possible, and passed on (with modifications that may be appropriate according to device logic), to downstream receivers.

After certain processing as described herein, NIC 160 may pass messages through to an interface circuit 165. In embodiments herein interface circuit 165 further may process the incoming messages and provide them to an on-die interconnect (ODI) 170. In embodiments, on-die interconnect 170 may take many different forms, including as a ring or mesh, among others. As shown, on-die interconnect 170 may couple to a CPU 175 of edge platform 150. In various embodiments, CPU 175 may be implemented as a plurality of processing cores, e.g., homogeneous or heterogeneous processing cores. In any event, as further shown on-die interconnect 170 may pass received messages to another interface circuit 180 that in turn may further process messages and pass them onto a target agent shown as an accelerator 190. While in FIG. 1, the target agent is shown as accelerator 190, a variety of different target agents or destination circuits may be used in embodiments, including storage resources, cryptographic resources, among many other different types of destination circuits.

Circuitry within interface circuits 165, 180 (or other interface circuitry such as a hardware queue manager (HQM)) may implement prioritized scheduling of payloads. Note that in an embodiment, interface circuits 165, 180 and other internal components may communicate according to a PCIe-based protocol. As such, these interface circuits may include PCIe logic blocks. Similar circuitry within interface circuit 180 and/or ODI 170 may merge or blend incoming smaller chunk traffic, if a target device like accelerator 190 can indeed accept a larger unit in which data may be streamed into it. The HQM may obtain metadata containing SLA performance objectives and tenant partitioning/chunking profiles to best determine how to transition from a first interface circuit to a second interface circuit. A different mix of chunking may be applied at each transition, and understand that different implementations may define different policy definitions for efficient chunking across interfaces. As one example, a 'big/little' approach may be used, where a large and a few small payloads that have similar latency, throughput characteristics are chunked together. This avoids overhead of marshalling many smaller messages into a large chunk. It also avoids fragmentation due to use of large messages that cannot fit a second large message, but does not fully occupy the chunk.

In the embodiment of FIG. 1, at least two different groups of edge devices are sending data to be processed; the first in payloads of 64 bytes and the second in payloads sized in 4 KB units. Both data types may be ultimately routed to a discrete accelerator hosted near a different CPU or mesh stop. Further assume that the first group requires high priority handling and the second group requires medium priority handling.

For example, ODI 170 and interface circuitry 180 may organize the first type of workload as 512-byte chunks by merging multiple 64-byte chunks, knowing that it has to be some granularity between 64-bytes (minimum) and 4 KB (best possible).

Note that accelerator 190 may have a device interface so that it can accept and process payloads at different optimized granularity. Further understand, in some cases after such processing, accelerator 190 may provide response messages to be communicated back through the hierarchy shown in edge platform 150 and through RAN's 120, 130 to an originator (requester) edge device such as any one or more of edge devices 110, 112, 114.

With embodiments herein, the edge devices may communicate messages that include various metadata including but not limited to priority information and granularity information. In turn, edge platform 150 may leverage this information in handling the flow of messages in the platform, realizing an efficient and adaptive peer-to-peer data transmission scheme between the edge devices and a target agent within edge platform 150. In this way, incoming requests from different devices may be handled with different priorities to accommodate, e.g., service level agreements in an agile manner. Still further, embodiments of an edge platform may provide for efficient data processing schemes for incoming messages having data payloads of different granularities.

In contrast without an embodiment, incoming messages that have included priority information may lose this information at the point that the messages are received within an edge platform since a conventional platform does not process messages using such information. And further without an embodiment in which packets are merged, PCIe efficiency in the target device (accelerator) is substantially reduced, particularly when handling packets of the second group, given their milder latency requirements. This is so as connected architectures do not apply any hint-based adaptive merging policies at the PCIe level.

To enable edge devices such as edge devices 110-114 in FIG. 1 to leverage efficient end-to-end communication by use of metadata including priority and granularity information, edge platform 150 may provide interface information to the edge devices. More specifically in embodiments, edge platform 150, e.g., during an initial connection process, may expose application programming interface (API) information to allow edge devices to provide hint-based information, including priority, granularity and/or other metadata information. Note that such API information may be used by a software stack within edge platform 150 to enable communication and use of this hint information. Understand while shown at this high level in the embodiment of FIG. 1, many variations and alternatives are possible.

Figure 2:
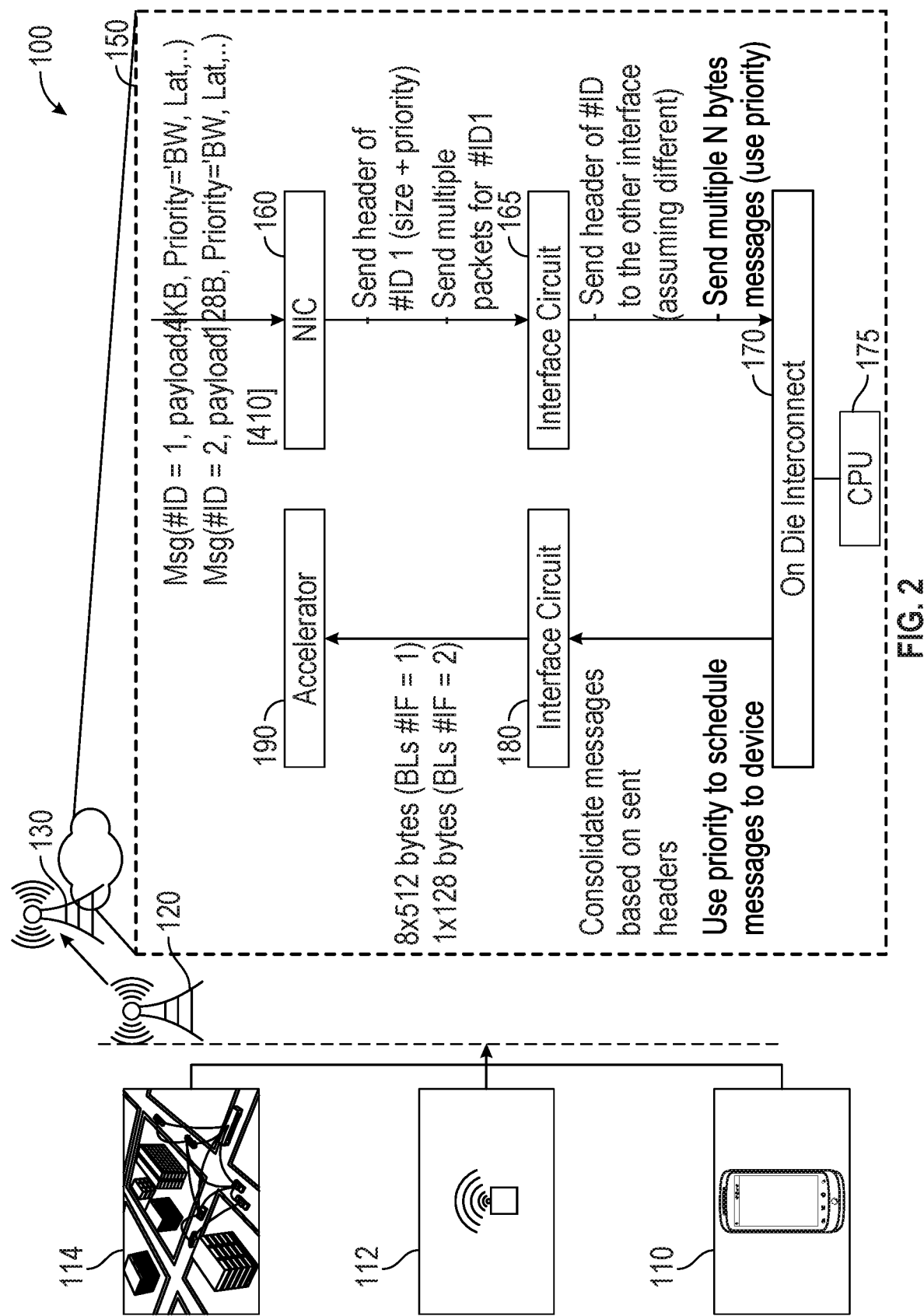
FIG. 2 is a block diagram of an edge platform in accordance with an embodiment.

Referring now to FIG. 2, shown is a block diagram of an edge platform in accordance with an embodiment. As shown in FIG. 2, edge platform 150 may take the same high level view as shown in FIG. 1. However in this figure, a high level view of disparate handling of different incoming messages (from different edge devices) is shown. Specifically as seen, NIC 160 receives 2 different messages from two different edge devices. Assume for purposes of discussion that message number 1 (namely having message ID 1) is from a smartphone or other portable device that communicates with a payload size of 4 KB. Further shown, assume that this first incoming message has a medium priority. This medium priority may correspond to a SLA that calls for a medium level of latency. As further shown, message number 2 (namely having message ID 2) is from a sensor or other IoT device that communicates with a payload size of 64 bytes. Further shown, assume that this second incoming message has a high priority in that it calls for a low level of latency. Note also it is possible for messages such as this second message may result from individual messages from two devices that allow payloads to be merged. For example, as part of an interface definition, a device may be able to specify, in addition to payload granularity, whether its payloads can be merged with payloads of other edge devices targeting a given accelerator.

As illustrated, NIC 160 may communicate header information of the messages that includes this metadata (namely priority and granularity information) downstream to additional components of edge platform 150. After header communication, NIC 160 may send multiple packets that include payload information of a given message. In the high level shown in FIG. 2, communication details for the first message are listed. Understand that similar information may be sent for the second message and additional messages.

As further illustrated in FIG. 2, interface circuit 165 may send header information (which may be the same header information received from NIC 160) along to interconnect 170. In turn, on-die interconnect 170 passes along this information to interface circuit 180. Interface circuit 180 may make merging and/or scheduling decisions based at least in part on the header information. For example, interface circuit 180 may consolidate messages based at least in part on one or more of priority information and granularity information included in the received headers. In addition, interface circuit 180 may schedule message delivery to a target device (e.g., accelerator 190) based at least in part on the priority information. Thus as illustrated in FIG. 2, interface circuit 180 may send multiple data packets (e.g., 8 separate 512 byte packets) of the first message to accelerator 190. And interface circuit 180 may send an additional packet, e.g., 1×128 bytes, of the second message. Understand while shown with these example packets within message communications, many variations and alternatives are possible.

Figure 3:
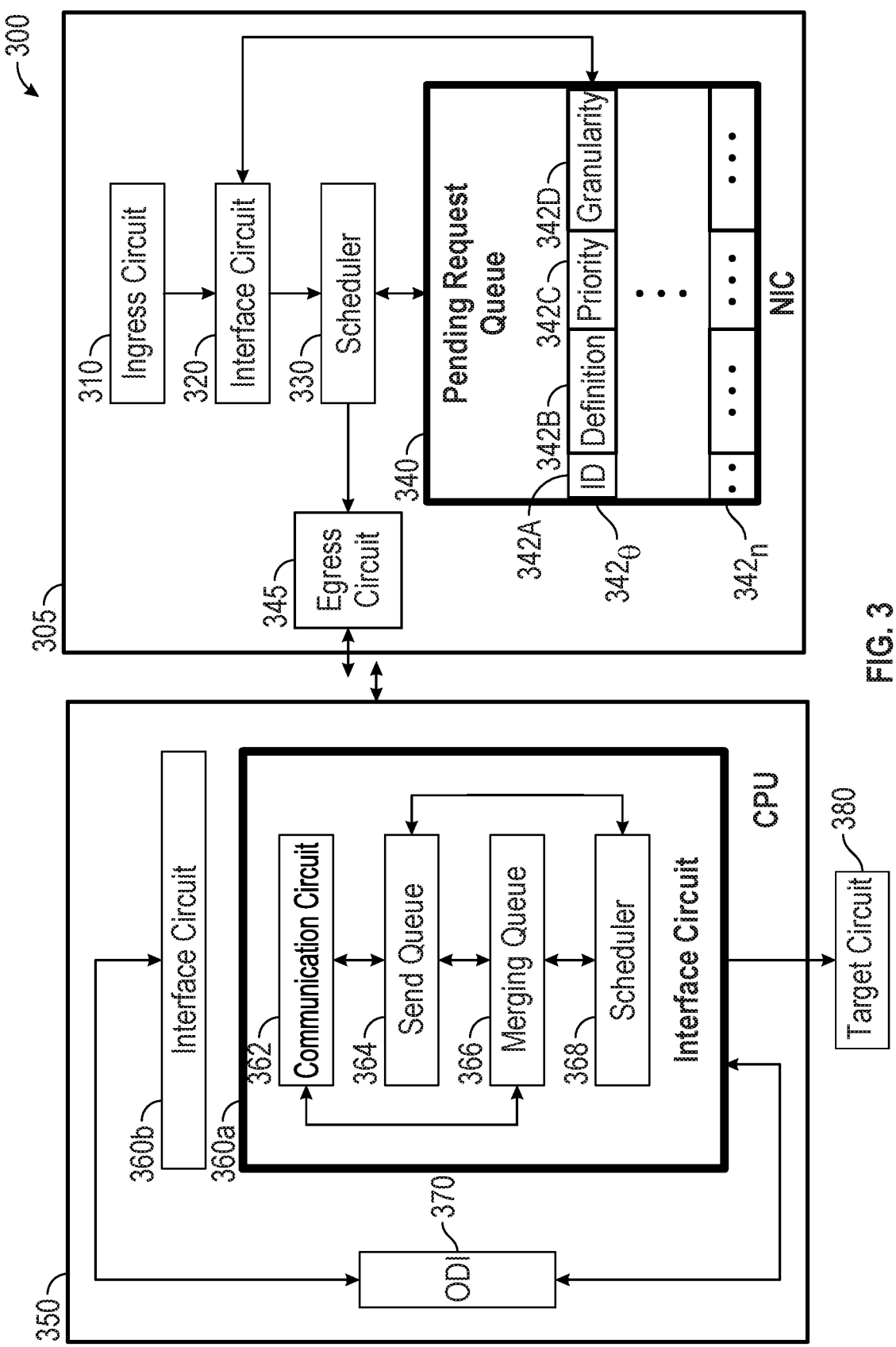
FIG. 3 is a more detailed block diagram of an edge platform in accordance with an embodiment.

Referring now to FIG. 3, shown is a more detailed block diagram of an edge platform in accordance with an embodiment. As shown in FIG. 3 edge platform 300 includes, at a high level, a NIC 305, a CPU 350 and a target circuit 380. As one particular example, all the circuitry shown in FIG. 3 may be implemented in a single system on chip (SoC), which in some cases may be formed on a single integrated circuit semiconductor die. In other cases, a multi-die SoC may be present. In yet other cases, edge platform 300 may be formed of multiple discrete integrated circuits. Of course while the high level view in FIG. 3 shows only limited components, understand that edge platform 300 includes various other circuitry, including memories, storage, power circuitry and so forth.

As illustrated, incoming messages from various edge devices (not shown in the illustration of FIG. 3) are received by way of NIC 305. In various embodiments, discrete intermediary devices (such as NIC 305) may include elements that allow a sender (such as a networking client) to communicate priority and granularity information for processing the sender's request at the intermediary device and also at a subsequent receiver. While the implementations may be different for different discrete devices, a discrete device may include various capabilities visible from a sender's standpoint, such as may be communicated by way of application programming interface information or so forth. These capabilities may be implemented within circuitry of NIC 305 to effectively receive and handle different messages from disparate devices.

In the illustration of FIG. 3, NIC 305 includes an ingress circuit 310 that receives incoming messages and provides them to interface circuit 320. As shown, interface circuit 320 couples to a scheduler 330 and further to a pending request queue 340. Ingress circuit 310 may be configured to receive incoming requests that a sending device may submit that it wants to route to a device or devices at other peers. In turn, interface circuit 320 may be configured to process incoming requests. In an embodiment, interface circuit 320 may process requests according to metadata that may include one or more of: a priority for that request (which may be specified as a multi-metric vector (e.g., latency, bandwidth, etc.)) and/or a desirable granularity for sending to a target device (e.g., for maximizing performance, PCIe link utilization, etc.).

Pending request queue 340 may include a plurality of entries $342_0$-$342_n$. In the embodiment shown, each entry 342 may include various fields, including an ID field $342_A$, a definition field $342_B$, a priority field $342_C$, and a granularity field $342_D$. Each of these fields may include corresponding information of a given message. Namely, ID field $342_A$ may store a message ID for a corresponding message, definition field $342_B$ may store definition information which may include, e.g., actual payload information and target information (e.g., a destination of the message), priority field $342_C$ may include priority information (which in one embodiment may be one of multiple priority levels such as low, medium or high), and granularity field $342_D$ may store granularity information, e.g., a payload size of the corresponding message. Of course while shown these particular fields and information in the embodiment of FIG. 3, many variations and alternatives are possible.

In an embodiment, pending queue request 340 may be ordered by priority. Note that it is possible for this priority to be re-computed as time advances. For instance, requests with low priority may typically have their priority rise over time as they remain within pending request queue 340. In an embodiment, priority may be computed in a manner that takes into account various sub-priorities for different performance, power, and efficiency parameters. For instance, a low-latency class (e.g., a speed parameter) may be given a certain weight (e.g., 80% weight), and a bandwidth parameter may be given another weight (e.g., 20% weight), to reflect that achieving fast response requires minimizing queuing time.

As further seen, scheduler 330 also couples to pending request queue 340. Scheduler 330 may be configured to schedule messages for communication based at least in part on priority and or granularity information as described herein. When a given message (or portion thereof) is selected by scheduler 330, it may be communicated out of NIC 305 via an ingress circuit 345. Scheduler 330 may schedule requests within pending request queue 340. Scheduler 330 may pick the first pending request (when possible) and process it. Processing it causes it to be sent to a target agent via an egress circuit 345.

Still referring to FIG. 3, edge platform 300 also includes a CPU 350. Understand that CPU 350 may be one of multiple independent domains of edge platform 300, and may include various processing cores (not shown for ease of illustration in FIG. 3). In different cases, CPU 350 may include a plurality of cores. Further in some cases CPU 350 or a separate domain of edge platform 300 may include one or more graphics processing units or other processing circuits. In the high level of FIG. 3 CPU domain 350 includes multiple interface circuits $360_a$, $360_b$. Details of interface circuit 360a are shown. In general, interface circuits 360 may act as hardware interface circuitry to enable communication between disparate components within edge platform 300 such as interfacing between NIC 305, and on die interconnect 370 and target circuit 380, as examples. Note that interface circuits 360 may be configured to handle communications both as a sender and as a receiver.

In embodiments herein, interface circuits 360 may include logic to leverage at least some priority and granularity information received in messages from edge devices to flexibly and dynamically route these messages to an intended target in an efficient end-to-end manner.

As illustrated, interface circuit 360 includes a communication circuit 362 that in turn is coupled to corresponding queues, namely a send queue 364 and a merging queue 366. When acting as a sender, interface circuit 360 may leverage communication circuit 362 as an interface to enqueue requests, allowing specification of, e.g., priority and granularity. Send queue 364 may be configured to store pending requests. A scheduler 368 may be configured to select which of the pending requests on send queue 364 are sent to a target agent. In embodiments herein, send queue 364 may include a plurality of entries each to store information of one or more messages to enable such messages to be sent to peer devices. In turn, merging queue 366 may include a plurality of entries each to store information of one or more messages. In embodiments herein scheduler 368 may cause the message information of multiple messages to be combined or merged into a single entry of merging queue 366.

When scheduler 368 selects a request, it sends a message header to a PCIe logic block that manages the target device with priority and granularity information. Next, scheduler 368 starts processing the request by sending one or more packets (e.g., implemented as on-die interconnect packets) to the target PCIe logic block until all of the original payload is transmitted. Note that multiple requests from send queue 364 that target different PCIe logic blocks (different devices or CPUs) may be processed at the same time. Various policies or heuristics may govern spreading out requests among different targets. As examples these considerations may include saturation at ODI 370 for the target, and/or alternating latency-sensitive requests versus bandwidth-sensitive requests. In the earlier example, scheduler 368 may decide to alternate messages to ODI 370 from different messages 1 and 2 in different batches of 64 bytes (or the ODI channel bandwidth).

When acting as a receiver (processing received requests from the PCIe logic block), interface circuit 360 may utilize merging queue 366 to store in-flight requests coming from the peer PCIe logic block that map to a particular device transaction. Merging queue 366 may store all incoming payloads coming from ODI 370 and peer PCIe logic. Merging queue 366 may be configured to merge and send the payloads. In doing so, it maps payloads arriving into it at ODI granularity into payloads at equal/higher granularity, depending on one or more of: granularity specified through the interface; supported granularity for the link; and priority of different pending requests.

As further illustrated in FIG. 3, interface circuits 360a, 360b may communicate with each other via an on-die interconnect 370. Understand that in other embodiments interface circuits may directly coupled to each other. Interface circuit 360b may, in some embodiments, be configured similarly to interface circuit 360a. And as shown, interface circuit 360a may couple to a target circuit 380. In an embodiment, target circuit 380 may be a given type of accelerator such as a field programmable gate array (FPGA) that is configured to perform particular functions or processing. In turn, target circuit 380 may process input messages accordingly. And understand that depending on request, after processing target circuit 380 may send a response, which may be directed back through edge platform 300 and to the requester. Note that this message also may be handled using priority/granularity information. A given edge platform may include many different types of target circuits, including accelerators, cores, graphics processing units, storage devices and so forth. Understand while shown at this high level of FIG. 3, many variations and alternatives are possible.

Figure 4:
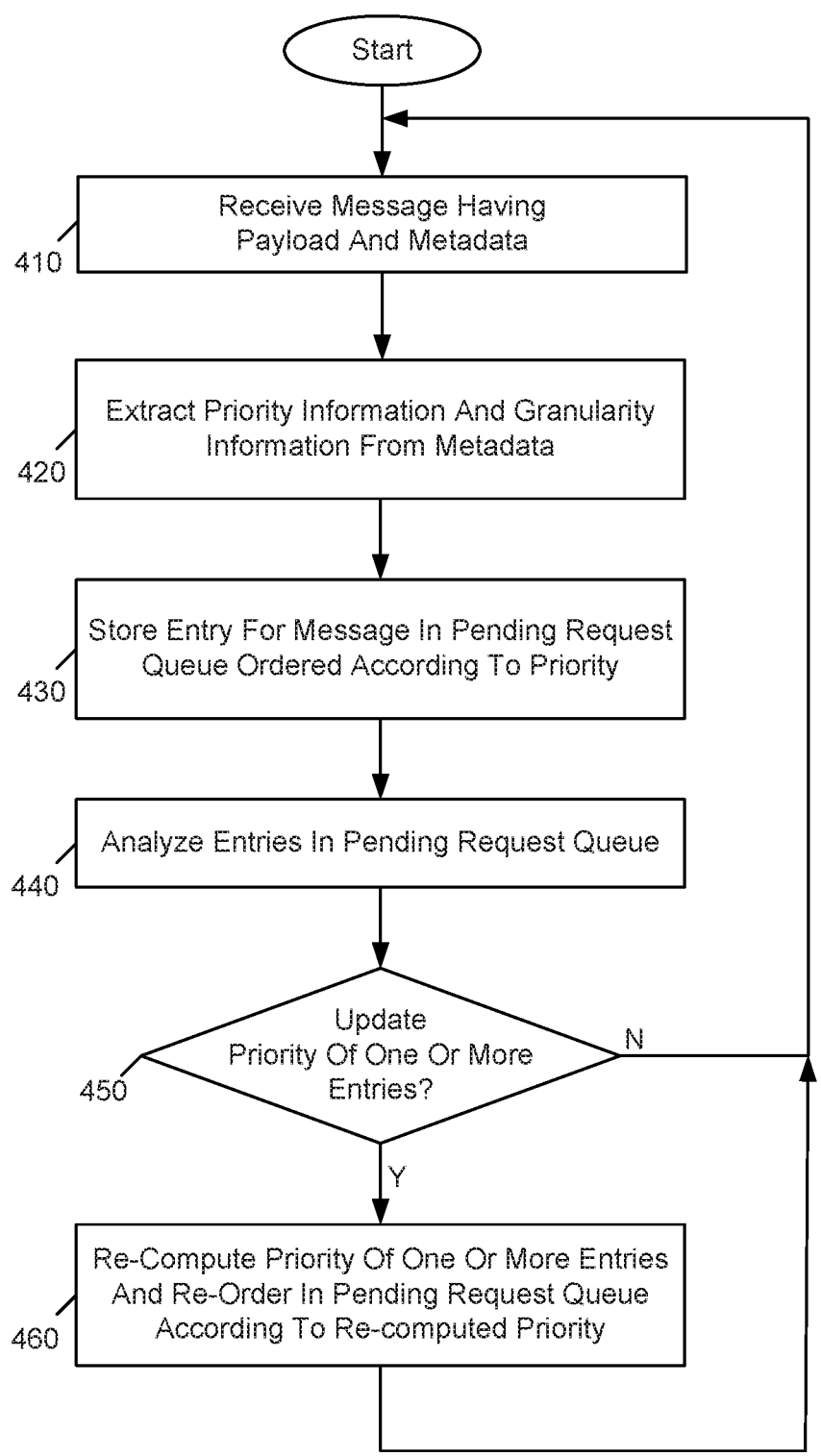
FIG. 4 is a flow diagram of a method in accordance with one embodiment of the present invention.

Referring now to FIG. 4, shown is a flow diagram of a method in accordance with one embodiment of the present invention. As shown in FIG. 4, method 400 is a method for handling received incoming messages within an edge platform from one or more connected devices. As such, method 400 may be performed by circuitry within the edge platform such as a NIC which may include hardware circuitry, firmware, software and/or combinations thereof. As illustrated, method 400 begins by receiving an incoming message that has a payload and metadata (block 410). For example, the NIC may receive this message via one or more RANs to which edge devices can be wirelessly coupled. Note that the message may be of varying size, e.g., based at least in part on type of device. Furthermore, the message may have one of different priorities. For example, incoming messages that are requests for edge processing may be received with a given priority level that is based at least in part on a service level agreement associated with device or user.

Still with reference to FIG. 4, at block 420 priority information and granularity information may be extracted from the metadata. In an embodiment, the priority information may indicate one of multiple priority levels. In different embodiments, there may be two levels, e.g., low and high. In other embodiments there may be three or more levels. In turn, the granularity information may apprise as to a size of payload information of the message. For example, some devices communicate payload information that is, e.g., 64 bytes wide, while other devices may communicate payload information that is, e.g., of some kilobyte width. Note that the metadata may include other information in certain embodiments. For example, in other cases additional metadata such as specific deadlines for the request and/or tenant information associated with the request may be included and further may be used to control disparate processing of different messages.

Next at block 430 the message may be stored in an entry of a pending request queue. In an embodiment, this queue may be ordered according to priority. As such, a higher priority message may be placed closer to a head of the queue than lower priority messages. In embodiments, the pending request queue may have sufficient space to maximize the width of the target device. For example if bus width is 512 bytes, the queue could be at a minimum 512 bytes to enable merging of multiple messages. And a wider queue may enable more advanced policies.

As time progresses, the NIC may analyze entries in the queue (block 440). Based on this analysis it may be determined at diamond 450 whether the priority of one or more entries is to be updated. If not, method 400 may proceed back to block 410 for handling additional received messages. If instead it is determined that priority is to be updated, control passes to block 460 where priority may be recomputed. For example, where a request of a given priority has been sitting too long in an entry and is nearing a latency threshold for the message, its priority may be recomputed. In addition to recomputing priority, a message may be re-ordered within the pending request queue according to the priority. Understand that additional operations may occur within the NIC. For example, although not shown in the high level of FIG. 4, additional analysis of entries may indicate one or more messages of different entries can be merged into a single entry, e.g., when these messages have relatively small payload granularity. And while FIG. 4 is discussed in the context of a NIC, similar operations including the recomputing of priority may occur in other components on a path to a destination of a message.

Figure 5:
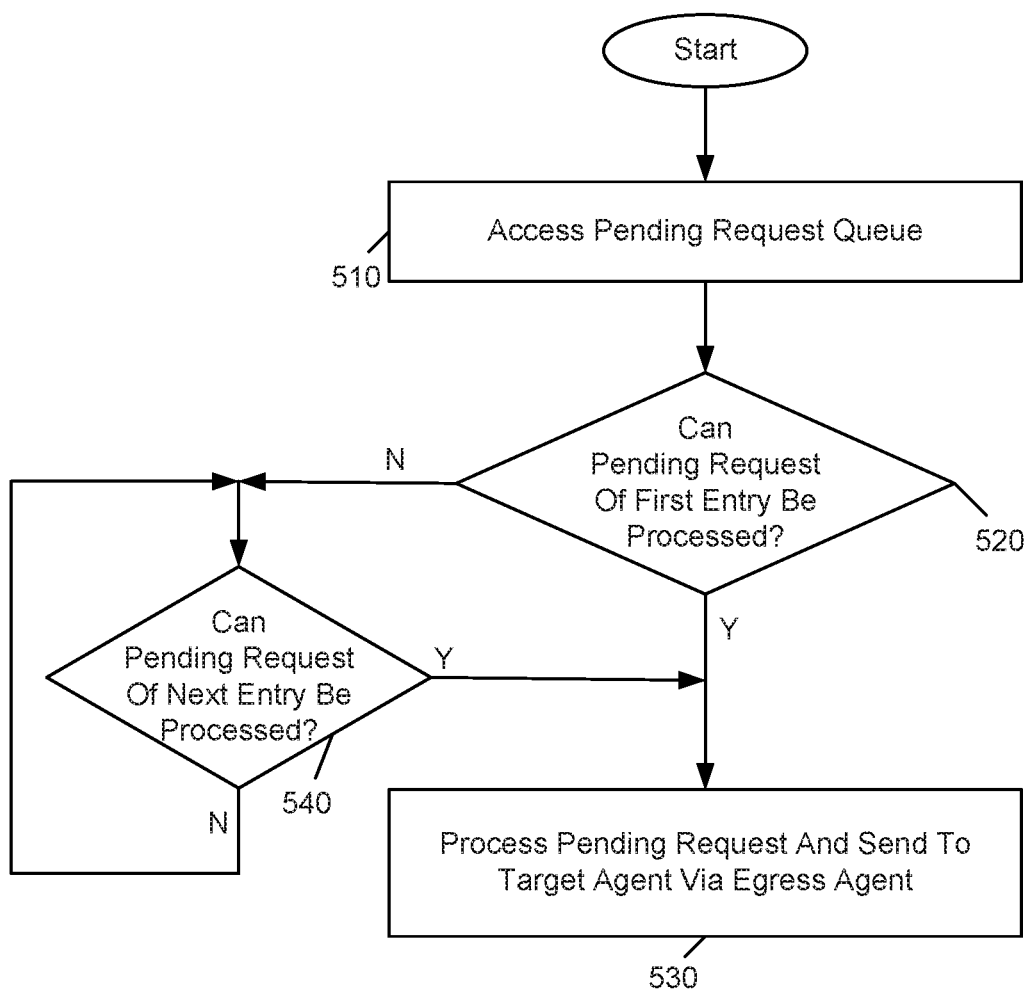
FIG. 5 is a flow diagram of a method in accordance with another embodiment of the present invention.

Referring now to FIG. 5, shown is a flow diagram of a method in accordance with another embodiment of the present invention. As shown in FIG. 5, method 500 is a method for scheduling messages to be sent from a pending request queue. As such, method 500 may be performed by a scheduler or other circuitry of an edge platform. Accordingly, method 500 may be performed by a hardware circuitry, firmware, software and/or combinations thereof. As illustrated, method 500 begins by accessing a pending request queue (block 510). As described herein, the pending request queue may include multiple entries each to store information of one or more messages. As shown, control passes to diamond 520 to determine whether the pending request in the first entry can be processed. This determination may be based on various information including availability of resources, e.g., bandwidth resources, storage resources on a path to destination device or so forth. If it is determined that a request can be processed, control next passes to block 530, where the pending request will be processed and sent to the target agent via an egress agent. For example, the scheduler may cause the request to be passed along, e.g., via PCIe interface circuitry that couples, directly or indirectly, to a target agent, such as a given destination device, e.g., an accelerator.

Instead if it is determined that the pending request of the first entry cannot be processed, control passes next to diamond 540 to determine whether the pending request of the next entry can be processed. If so, control passes block 530 discussed above. Otherwise, diamond 540 may be executed iteratively to determine whether an entry within the pending request queue is capable of being processed. Understand while shown at this high level in the embodiment of FIG. 5, many variations and alternatives are possible.

Figure 6:
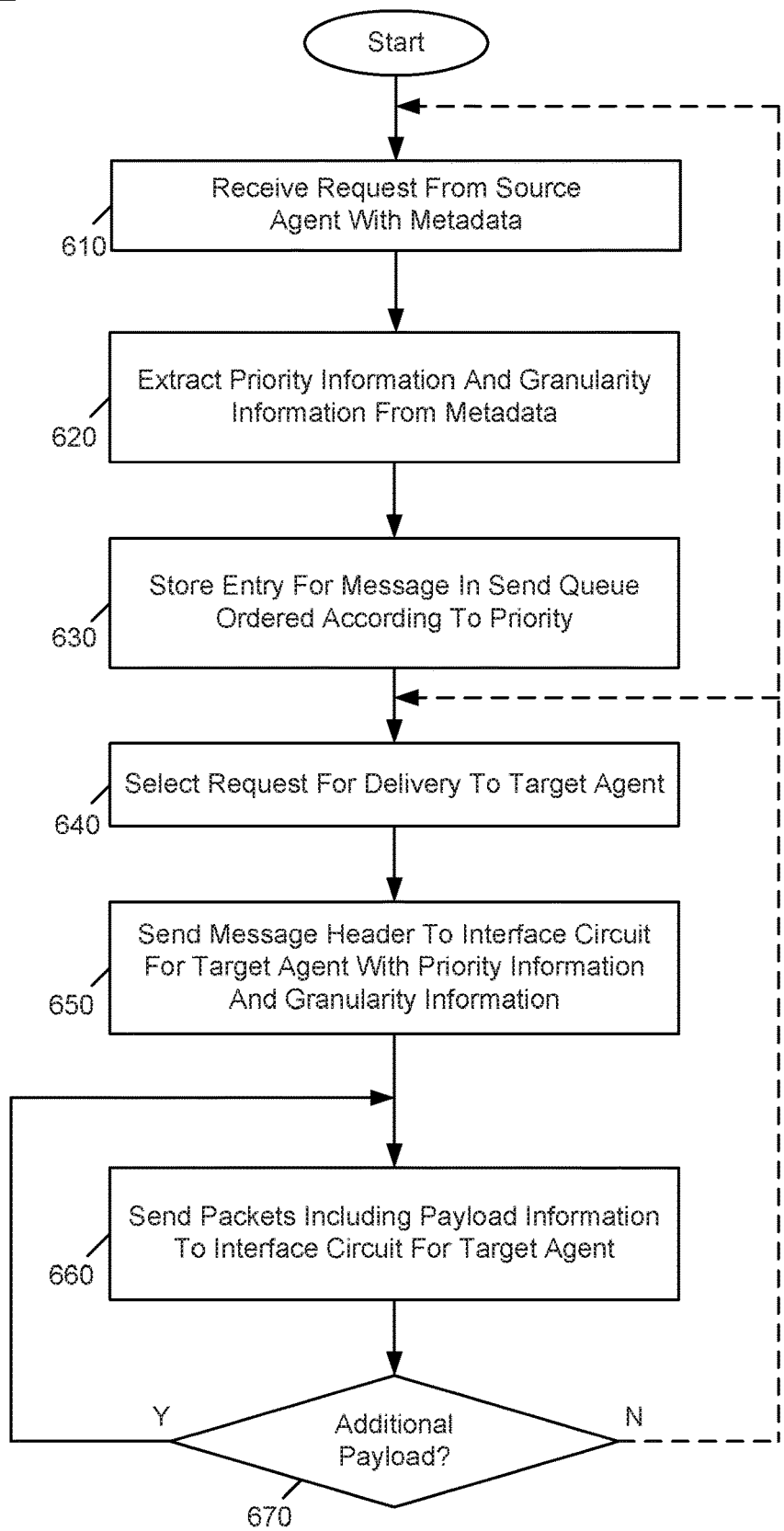
FIG. 6 is a flow diagram of a method in accordance with yet another embodiment of the present invention.

Referring now to FIG. 6, shown is a flow diagram of a method in accordance with yet another embodiment of the present invention. As shown in FIG. 6, method 600 is a method for handling received incoming messages within an interface circuit of an edge platform that couples between a NIC and a destination circuit. As such, method 600 may be performed by circuitry within the edge platform such as an interface circuit which may include hardware circuitry, firmware, software and/or combinations thereof. As illustrated, method 600 begins by receiving a request from a source agent (e.g., a NIC or so forth) that has metadata (block 610).

Still with reference to FIG. 6, at block 620 priority information and granularity information may be extracted from the metadata. Next at block 630 the message may be stored in an entry of a send queue ordered according to priority. Then at block 640, a given request may be selected for delivery to the target agent. Selection of a particular request may be based at least in part on priority associated with the request.

At block 650 a message header may be sent to an interface circuit for the target agent. This message header may include priority information and granularity information for the request. Note that this interface circuit may use such information in determining whether the request can be merged with one or more other requests and/or for purposes of scheduling delivery of the request to the target agent. After this message header is sent, control next passes to block 660 where one or more packets including payload information of the request is sent to the interface circuit. Such operation may proceed iteratively as determined at diamond 670 so long as there is additional payload for this request. At the conclusion of this communication, control passes back to block 640 where another request may be selected to be sent to the target agent. As further shown, control also may optionally pass back to block 610, where another request may be received from a source agent.

Figure 7:
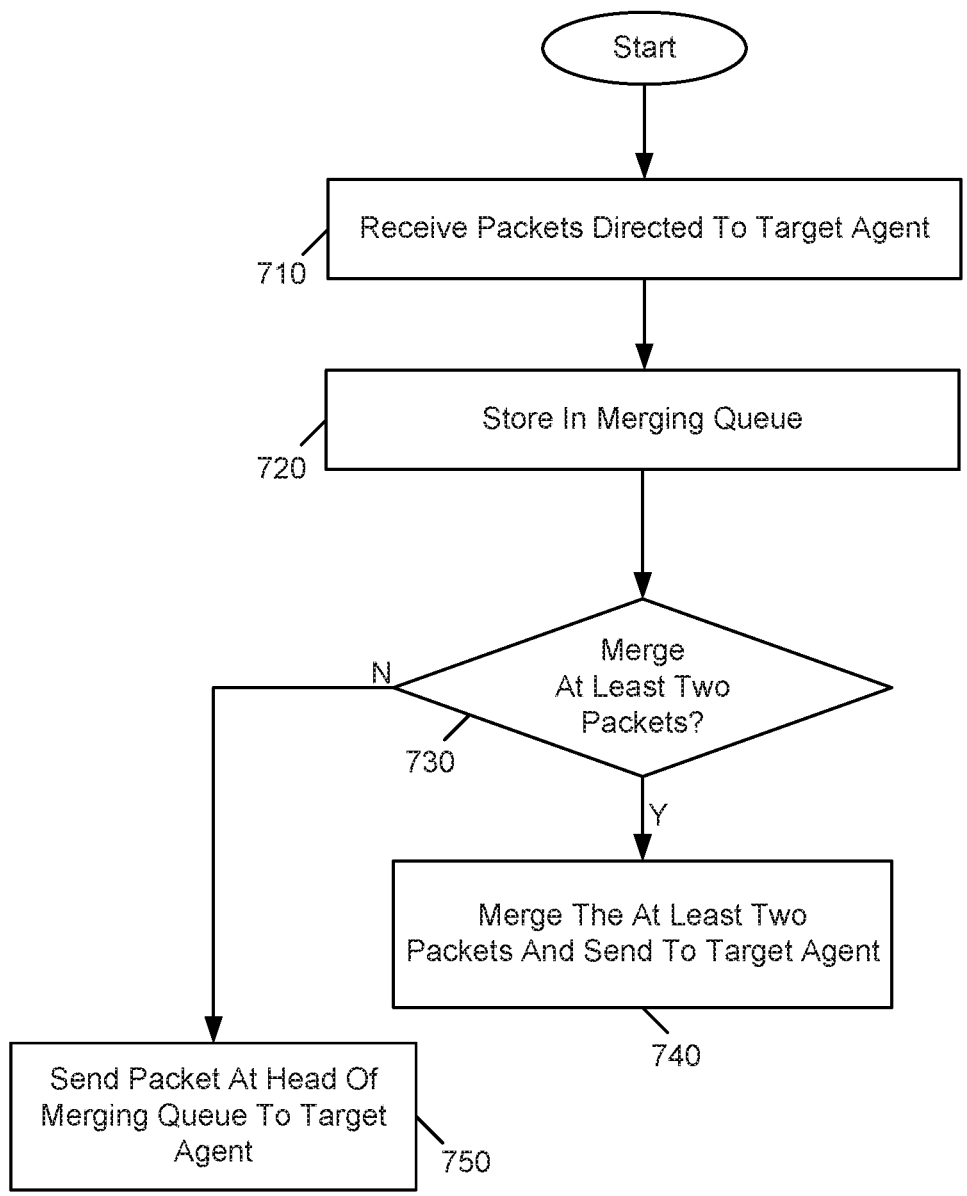
FIG. 7 is a flow diagram of a method in accordance with yet another embodiment of the present invention.

Referring now to FIG. 7, shown is a flow diagram of a method in accordance with yet another embodiment of the present invention. As shown in FIG. 7, method 700 is a method for handling received incoming messages within an interface circuit of an edge platform. As such, method 700 may be performed by circuitry within the edge platform such as an interface circuit which may include hardware circuitry, firmware, software and/or combinations thereof. As illustrated, method 700 begins by receiving a request that is directed to a target agent (e.g., an accelerator or so forth) (block 710). Next at block 720 received packets may be stored in a merging queue. Then at block 730 it may be determined whether to merge at least two packets. Although the scope of the present invention is not limited in this regard, in an embodiment this determination may be based at least in part on granularity information associated with the packets that indicates that the packets are of a relatively small size, such that multiple packets can be merged. If this determination is in the positive, control passes to block 740 where at least two packets may be merged and sent to the target agent. In this way, more effective and efficient communication may occur with reduced power consumption. This is so since instead of sending two packets having small amounts of payload, e.g., 64 bytes, a single packet having a larger payload can be sent.

Instead if it is determined that these two packets cannot be merged, control passes from diamond 730 to block 750 where the packet at the head of the merging queue can be sent to the target agent. Note that while FIG. 7 is discussed in the context of an interface circuit, similar operations including the merging of packets may occur in other components on a path to a destination of a message.

Embodiments enable dynamic integration of multiple devices, including devices in distributed systems, for flexible and prioritized handling of requests at CPUs, GPUs, and accelerators. In this way, embodiments unlock the potentials in an edge cloud ecosystem with just-in-time complex content processing and bandwidth demanding workloads.

Figure 8:
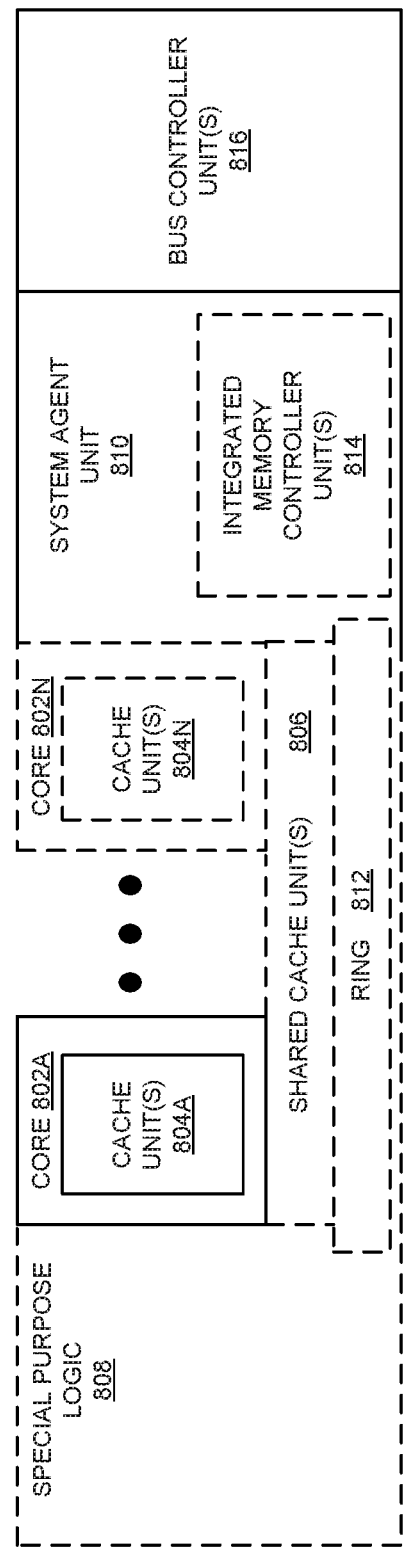
FIG. 8 is a block diagram of a processor in accordance with an embodiment.

Note that different processor implementations that can process incoming messages with disparate handling may be used in edge platforms. Referring now to FIG. 8, shown is a block diagram of a processor 800 that may have more than one core, may have an integrated memory controller, and may have integrated graphics according to embodiments of the invention. The solid lined boxes in FIG. 8 illustrate a processor 800 with a single core 802A, a system agent 810, a set of one or more bus controller units 816, while the optional addition of the dashed lined boxes illustrates an alternative processor with multiple cores 802A-N, a set of one or more integrated memory controller unit(s) 814 in the system agent unit 810, and special purpose logic 808. In different implementations herein, special purpose logic 808 may be a target agent such as an accelerator (which may be a FPGA) configured to receive and process incoming messages from disparate edge devices.

Thus, different implementations of the processor 800 may include: 1) a CPU with the special purpose logic 808 being integrated graphics and/or scientific (throughput) logic (which may include one or more cores), and the cores 802A-N being one or more general purpose cores (e.g., general purpose in-order cores, general purpose out-of-order cores, a combination of the two); 2) a coprocessor with the cores 802A-N being a large number of special purpose cores intended primarily for graphics and/or scientific (throughput); and 3) a coprocessor with the cores 802A-N being a large number of general purpose in-order cores. Thus, the processor 800 may be a general purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 800 may be a part of and/or may be implemented on one or more substrates using any of a number of process technologies, such as, for example, BiCMOS, CMOS, or NMOS.

The memory hierarchy includes one or more levels of cache within the cores 804A-N, a set or one or more shared cache units 806, and external memory (not shown) coupled to the set of integrated memory controller units 814. The set of shared cache units 806 may include one or more mid-level caches, such as level 2 (L2), level 3 (L3), level 4 (L4), or other levels of cache, a last level cache (LLC), and/or combinations thereof. While in one embodiment a ring based interconnect unit 812 interconnects the special purpose logic 808, the set of shared cache units 806, and the system agent unit 810/integrated memory controller unit(s) 814, alternative embodiments may use any number of well-known techniques for interconnecting such units. In one embodiment, coherency is maintained between one or more cache units 806 and cores 802-A-N.

In some embodiments, one or more of the cores 802A-N are capable of multi-threading. The system agent 810 includes those components coordinating and operating cores 802A-N. The system agent unit 810 may include for example a power control unit (PCU) and a display unit. The PCU may be or include logic and components needed for regulating the power state of the cores 802A-N and the special purpose logic 808.

The cores 802A-N may be homogenous or heterogeneous in terms of architecture instruction set; that is, two or more of the cores 802A-N may be capable of execution the same instruction set, while others may be capable of executing only a subset of that instruction set or a different instruction set.

Figure 9:
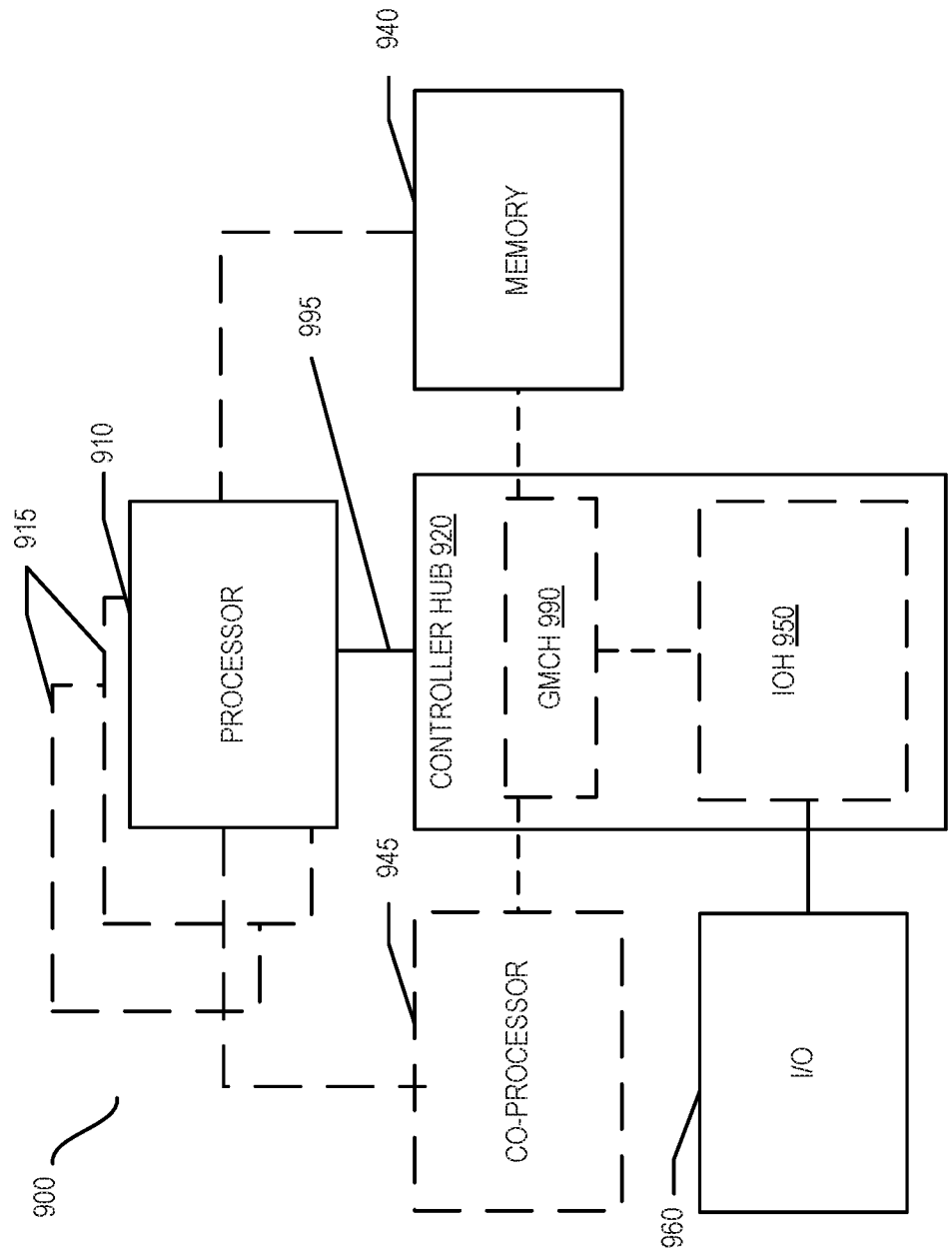
FIG. 9 is a block diagram of a computing system in accordance with an embodiment.

Note that edge platforms may be implemented in a wide variety of example computer architectures. Referring now to FIG. 9, shown is a block diagram of a system 900 in accordance with one embodiment of the present invention. The system 900 may be an edge platform that includes one or more processors 910, 915, which are coupled to a controller hub 920. In one embodiment, the controller hub 920 includes a graphics memory controller hub (GMCH) 990 and an Input/Output Hub (IOH) 950 (which may be on separate chips); the GMCH 990 includes memory and graphics controllers to which are coupled memory 940 and a coprocessor 945; the IOH 950 couples input/output (I/O) devices 960 to the GMCH 990. Alternatively, one or both of the memory and graphics controllers are integrated within the processor (as described herein), the memory 940 and the coprocessor 945 are coupled directly to the processor 910, and the controller hub 920 in a single chip with the IOH 950.

The optional nature of additional processors 915 is denoted in FIG. 9 with broken lines. Each processor 910, 915 may include one or more of the processing cores described herein and may be some version of the processor 800.

The memory 940 may be, for example, dynamic random access memory (DRAM), phase change memory (PCM), or a combination of the two. For at least one embodiment, the controller hub 920 communicates with the processor(s) 910, 915 via a multidrop bus, such as a frontside bus (FSB), point-to-point interface, or similar connection 995.

In one embodiment, the coprocessor 945 is a special-purpose processor, such as, for example, a high-throughput MIC processor, a network or communication processor, compression engine, graphics processor, GPGPU, embedded processor, or the like. In one embodiment, controller hub 920 may include an integrated graphics accelerator.

There can be a variety of differences between the physical resources 910, 915 in terms of a spectrum of metrics of merit including architectural, microarchitectural, thermal, power consumption characteristics, and the like.

In one embodiment, the processor 910 executes instructions that control data processing operations of a general type. Embedded within the instructions may be coprocessor instructions. The processor 910 recognizes these coprocessor instructions as being of a type that should be executed by the attached coprocessor 945. Accordingly, the processor 910 issues these coprocessor instructions (or control signals representing coprocessor instructions) on a coprocessor bus or other interconnect, to coprocessor 945. Coprocessor(s) 945 accept and execute the received coprocessor instructions.

Figure 10:
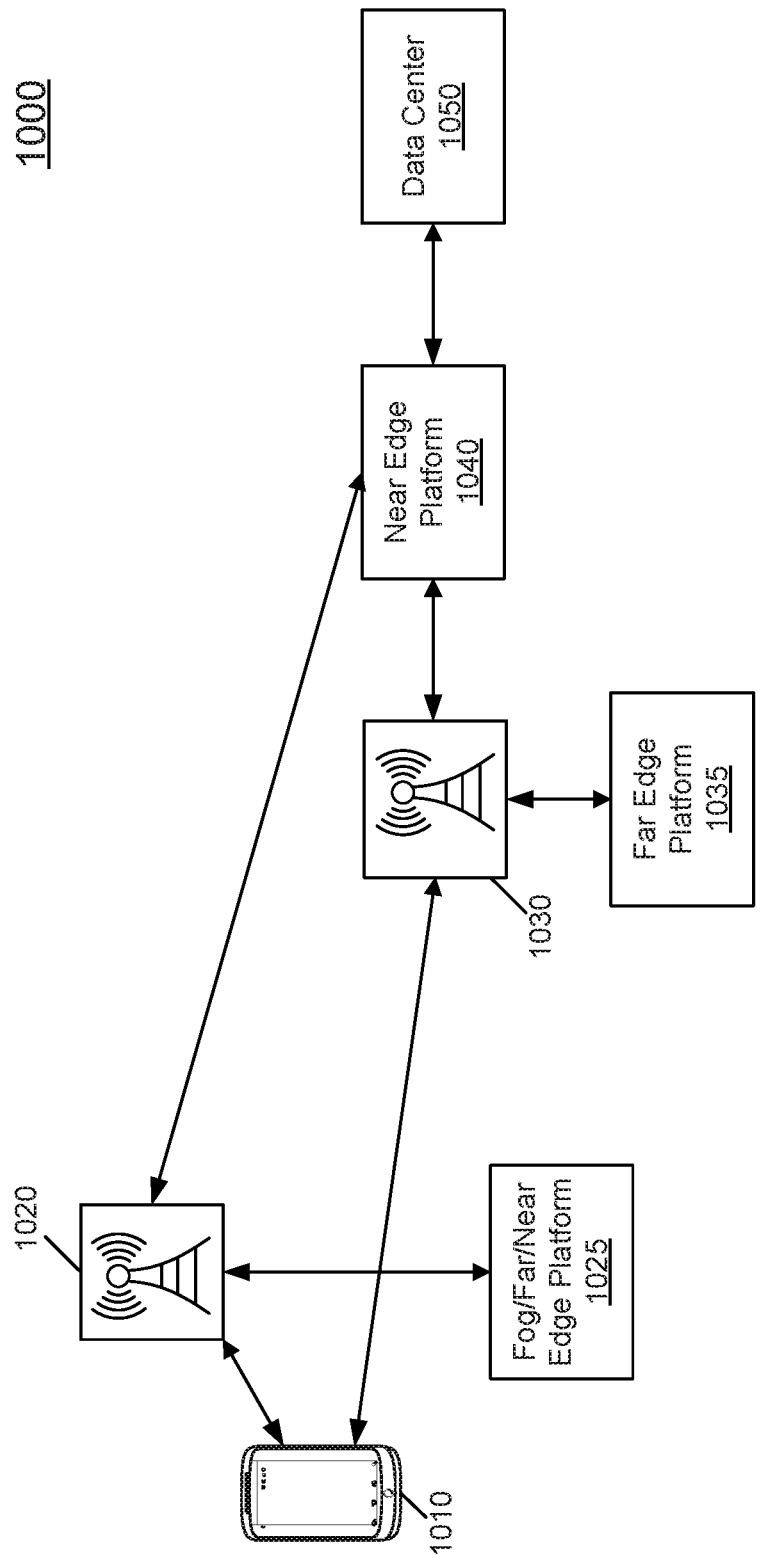
FIG. 10 is a block diagram of a network architecture in accordance with an embodiment.

Embodiments as described herein can be used in a wide variety of network architectures. To this end, many different types of computing platforms in a networked architecture that couples between a given edge device and a datacenter can perform the disparate message handling described herein. Referring now to FIG. 10, shown is a block diagram of a network architecture in accordance with another embodiment of the present invention. As shown in FIG. 10, network architecture 1000 includes various computing platforms that may be located in a very wide area, and which have different latencies in communicating with different devices.

In the high level view of FIG. 10, network architecture 1000 includes a representative device 1010, such as a smartphone. This device may communicate via different RANs, including a RAN 1020 and a RAN 1030. RAN 1020 in turn may couple to a platform 1025, which may be an edge platform such as a fog/far/near edge platform, and which may leverage embodiments herein to enable certain requested processing to be handled in short proximity to edge device 1010, to reduce latency of request handling. Other requests may be handled by a far edge platform 1035 coupled to RAN 1030. There may be some additional latency incurred in handling requests at far edge platform 1035 as compared to near edge platform 1025.

As further illustrated in FIG. 10, another near edge platform 1040 may couple to RANs 1020, 1030. Note that this near edge platform may be located closer to a data center 1050, which may have a large amount of computing resources. By pushing messages to these more remote platforms, greater latency is incurred in handling requests on behalf of edge device 1010. Understand that all platforms shown in FIG. 10 may incorporate embodiments as described herein to handle incoming messages from different devices with disparate handling.

The following examples pertain to further embodiments.

In one example, an apparatus comprises: a storage to receive incoming messages from edge devices coupled to the apparatus, the incoming messages comprising metadata including priority information and granularity information, the storage comprising a pending request queue to store at least some of the incoming messages based at least in part on the priority information; and an interface circuit coupled to the storage to receive the incoming messages from the storage at a first granularity, where the interface circuit is to store at least some of the incoming messages in a merging queue, merge at least two of the incoming messages into a merged message based at least in part on the priority information and send the merged message to a destination circuit at the first granularity or a second granularity greater than the first granularity.

In an example, the merged message includes the at least two incoming messages received from at least two edge devices.

In an example, the first priority information of a first incoming message is to be extracted and the first incoming message is to be stored in a first entry of the pending request queue according to the first priority information.

In an example, the pending request queue comprises a plurality of entries, each of the plurality of entries comprising a priority field to store the priority information and a granularity field to store the granularity information.

In an example, a priority of the first incoming message stored in the first entry is to be re-computed and one or more of the plurality of entries of the pending request queue are to be re-ordered according to the re-computed priority.

In an example, the apparatus comprises an edge platform coupled to the edge devices via at least one radio access network.

In an example, the edge platform comprises at least one SoC comprising a NIC, the interface circuit and the destination circuit.

In an example, the destination circuit comprises an accelerator to process at least some of the incoming messages, the accelerator comprising a field programmable gate array.

In an example, the SoC further comprises a communication fabric to couple the NIC to the interface circuit, where the NIC is to cause at least one incoming message stored in the pending request queue to be sent to the interface circuit further based at least in part on a congestion level of the communication fabric.

In an example, the edge platform is to send application programming interface information to the edge devices to indicate a capability of the edge platform to use the priority information and the granularity information.

In an example, the edge platform is to handle a first incoming message having a first priority received from a first edge device differently than a second incoming message having a second priority received from a second edge device.

In another example, a computer-implemented method comprises: receiving, in an edge platform, a plurality of messages from a plurality of edge devices coupled to the edge platform, the plurality of messages comprising metadata including priority information and granularity information; extracting at least the priority information from the plurality of messages; storing the plurality of messages in entries of a pending request queue according to the priority information; selecting a first message stored in the pending request queue for delivery to a destination circuit; and sending a message header for the first message to the destination circuit via at least one interface circuit, the message header including the priority information, and thereafter sending a plurality of packets including payload information of the first message to the destination circuit via the at least one interface circuit.

In an example, the method further comprises: storing the plurality of packets including the payload information in a merging queue associated with a first interface circuit; merging at least some of the plurality of packets into a merged message; and sending the merged message to the destination circuit.

In an example, the method further comprises re-computing a priority of the first message and re-ordering one or more entries of the pending request queue according to the re-computed priority.

In an example, the method further comprises sending application programming interface information to the plurality of edge devices to indicate a capability of the edge platform to use the priority information and the granularity information.

In an example, the method further comprises: processing the first message having a first priority received from a first edge device, including sending the first message to the destination circuit unmerged with any other message; and processing a second message having a second priority received from a second edge device differently than the first message, including sending the second message to the destination circuit merged with at least one other message from one of the plurality of edge devices.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In yet another example, a system may include: a NIC to receive incoming messages from a plurality of distributed edge devices coupled to the system, the incoming messages comprising metadata including priority information and granularity information, the NIC comprising a pending request queue to store at least some of the incoming messages based at least in part on the priority information; a first interface circuit coupled to the NIC, the first interface circuit to receive the incoming messages from the NIC, where the first interface circuit is to store at least some of the incoming messages in a merging queue, the first interface circuit to merge at least two of the incoming messages into a merged message; and a target circuit coupled to the first interface circuit, where the target circuit is to process the at least two of the incoming messages of the merged message.

In an example, the system comprises a SoC comprising the NIC, the first interface circuit and the target circuit, where the first interface circuit is coupled to the target circuit via a PCIe interconnect, where the merged message has a width substantially equal to a width of the PCIe interconnect, and the at least two incoming messages have a width substantially less than the width of the PCIe interconnect.

In an example, the system is to receive first incoming messages from a first distributed edge device having a first payload width and receive second incoming messages from a second distributed edge device having a second payload width, the system to differently handle the first incoming messages and the second incoming messages based at least in part on the priority information and the granularity information.

In an example, the system is to send information to the plurality of distributed edge devices to indicate a capability of the system to use the priority information and the granularity information.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EE- PROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   a storage to receive incoming messages from edge devices coupled to the apparatus, the incoming messages comprising metadata including priority information and granularity information, the storage comprising a pending request queue to store at least some of the incoming messages based at least in part on the priority information; and
   an interface circuit coupled to the storage, the interface circuit to receive the incoming messages from the storage at a first granularity, wherein the interface circuit is to store at least some of the incoming messages in a merging queue, merge at least two of the incoming messages into a merged message based at least in part on the priority information and send the merged message to a destination circuit at the first granularity.

2. The apparatus of claim 1, wherein the interface circuit is to couple to the destination circuit via a Peripheral Component Interconnect Express (PCIe) interconnect, and is to merge at least two others of the incoming messages into a second merged message having a width substantially equal to a width of the PCIe interconnect, the at least two others of the incoming messages having a width substantially less than the width of the PCIe interconnect.

3. The apparatus of claim 1, wherein first priority information of a first incoming message is to be extracted and the first incoming message is to be stored in a first entry of the pending request queue according to the first priority information.

4. The apparatus of claim 3, wherein the pending request queue comprises a plurality of entries, each of the plurality of entries comprising a priority field to store the priority information and a granularity field to store the granularity information.

5. The apparatus of claim 3, wherein a priority of the first incoming message stored in the first entry is to be re-computed and one or more of the plurality of entries of the pending request queue are to be re-ordered within the pending request queue according to the re-computed priority.

6. The apparatus of claim 1, wherein the apparatus comprises an edge platform coupled to the edge devices via at least one radio access network.

7. The apparatus of claim 6, wherein the edge platform comprises at least one system on chip (SoC), the at least one SoC comprising a network interface circuit (NIC), the interface circuit and the destination circuit.

8. The apparatus of claim 7, wherein the destination circuit comprises an accelerator to process at least some of the incoming messages, the accelerator comprising a field programmable gate array.

9. The apparatus of claim 7, wherein the SoC further comprises a communication fabric to couple the NIC to the interface circuit, wherein the NIC is to cause at least one incoming message stored in the pending request queue to be sent to the interface circuit further based at least in part on a congestion level of the communication fabric.

10. The apparatus of claim 6, wherein the edge platform is to send information to the edge devices to indicate a capability of the edge platform to use the priority information and the granularity information.

11. The apparatus of claim 6, wherein the edge platform is to handle a first incoming message having a first priority received from a first edge device differently than a second incoming message having a second priority received from a second edge device.

12. A computer-implemented method comprising:
    receiving, in an edge platform, a plurality of messages from a plurality of edge devices coupled to the edge platform, the plurality of messages comprising metadata including priority information and granularity information;
    extracting at least the priority information from the plurality of messages;
    storing the plurality of messages in entries of a pending request queue according to the priority information;
    re-computing a priority of a first message and re-ordering one or more entries within the pending request queue according to the re-computed priority of the first message;
    selecting the first message stored in the pending request queue for delivery to a destination circuit; and
    sending a message header for the first message to the destination circuit via at least one interface circuit, the message header including the priority information, and thereafter sending a plurality of packets including payload information of the first message to the destination circuit via the at least one interface circuit.

13. The method of claim 12, further comprising:
    storing the plurality of packets including the payload information in a merging queue associated with a first interface circuit;
    merging at least some of the plurality of packets into a merged message; and sending the merged message to the destination circuit.

14. The method of claim 12, further comprising sending application programming interface information to the plurality of edge devices to indicate a capability of the edge platform to use the priority information and the granularity information.

15. The method of claim 12, further comprising:
    processing the first message having a first priority received from a first edge device, including sending the first message to the destination circuit unmerged with any other message; and
    processing a second message having a second priority received from a second edge device differently than the first message, including sending the second message to the destination circuit merged with at least one other message from one of the plurality of edge devices.

16. A system comprising:
    a system on chip comprising:
        a network interface circuit (NIC) to receive incoming messages from a plurality of distributed edge devices, the incoming messages comprising metadata including priority information and granularity information, the NIC comprising a pending request queue to store at least some of the incoming messages based at least in part on the priority information;
        a first interface circuit coupled to the NIC, the first interface circuit to receive the incoming messages from the NIC, wherein the first interface circuit is to store at least some of the incoming messages in a merging queue, the first interface circuit to merge at least two of the incoming messages into a merged message; and a target circuit coupled to the first interface circuit, wherein the target circuit is to process the at least two of the incoming messages of the merged message, wherein the first interface circuit is coupled to the target circuit via a Peripheral Component Interconnect Express (PCIe) interconnect, wherein the merged message has a width substantially equal to a width of the PCIe interconnect, and the at least two incoming messages have a width substantially less than the width of the PCIe interconnect.

17. The system of claim 16, wherein the system is to receive first incoming messages from a first distributed edge device having a first payload width and receive second incoming messages from a second distributed edge device having a second payload width, the system to differently handle the first incoming messages and the second incoming messages based at least in part on the priority information and the granularity information.

18. The system of claim 16, wherein the system is to send information to the plurality of distributed edge devices to indicate a capability of the system to use the priority information and the granularity information.

\* \* \* \* \*